United States Patent [19]

Inoue et al.

[11] Patent Number: 4,869,861
[45] Date of Patent: Sep. 26, 1989

[54] PROCESS FOR PRODUCING A SHAPED AND DRAWN AROMATIC IMIDE POLYMER ARTICLE

[75] Inventors: Hiroshi Inoue; Tetsuji Hirano; Tadao Muramatsu; Yasuji Narahara, all of Hirakata, Japan

[73] Assignee: Ube Industries, Ltd., Yamaguchi, Japan

[21] Appl. No.: 198,100

[22] Filed: May 24, 1988

[30] Foreign Application Priority Data

May 29, 1987 [JP] Japan ................................. 62-136366

[51] Int. Cl.$^4$ ............................................... D01F 6/74
[52] U.S. Cl. ..................................... 264/204; 264/205; 264/210.1; 264/210.8; 264/211.17; 264/211.2; 264/234; 264/236; 264/345; 264/347
[58] Field of Search .................. 264/204, 210.2, 210.6, 264/210.8, 234, 288.4, 290.5, 331.19, 331.21, 345, 205, 210.1, 211.17, 211.2, 236, 347

[56] References Cited

U.S. PATENT DOCUMENTS

| | | | |
|---|---|---|---|
| 4,378,324 | 3/1983 | Makino et al. | 264/41 |
| 4,568,715 | 2/1986 | Itatani et al. | 524/346 |
| 4,725,484 | 2/1988 | Kumagawa et al. | 428/220 |

Primary Examiner—Hubert Lorin
Attorney, Agent, or Firm—Burgess, Ryan & Wayne

[57] ABSTRACT

A shaped and drawn aromatic imide polymer article, for example, a film or filament, is produced by shaping an aromatic polyamic acid solution containing an imidizing agent in a polar organic solvent while simultaneously imidizing a portion of the aromatic polyamic acid to an extent such that the resultant self-supporting precursory article contains 20% to 87% by weight of a volatile substance and has a tensile strength of at least 1.5 kg/mm$^2$ and an ultimate elongation of at least 30%, by drawing the precursory article at a draw ratio of 1.3 or more and by heat-treating the drawn article at a temperature of 150° C. or more.

10 Claims, No Drawings

PROCESS FOR PRODUCING A SHAPED AND DRAWN AROMATIC IMIDE POLYMER ARTICLE

BACKGROUND OF THE INVENTION

1. Field of the Invention

The present invention relates to a process for producing a shaped and drawn aromatic imide polymer article. More particularly, the present invention relates to a shaped and drawn aromatic imide polymer article, for example, a film or filament, having enhanced physical properties, for example, an excellent heat resistance and an enhanced tensile strength and modulus of elasticity.

2. Description of the Related Art

It is known that an aromatic imide polymer is usable for producing a shaped and drawn article. For example, Japanese Examined Patent Publication (Kokoku) No. 57-41330 discloses a process for producing a heat-shrinkable aromatic imide polymer film. In this process, a solution of an aromatic imide polymer precursor, for example, an aromatic polyamic acid or aromatic polyamide acid, in an organic solvent is converted to a film by a spreading method, the resultant precursor film is heat-dried at a temperature of 200° C. to 500° C. to an extent such that the resultant dried film contains less than 10% by weight of a volatile substance and at least 50% by weight of the aromatic imide polymer precursor in the film is converted to the corresponding imide polymer, and the resultant dried membrane is then drawn in at least one direction at a draw ratio of 1.05 to 5.0 and at a temperature of 100° C. to 500° C., to provide an aromatic imide polymer film.

In this method, the dried film, which contains the non-imidized portion of the aromatic imide polymer precursor together with the completely imidized portion thereof, is drawn, and thus the drawing procedure is effected while the non-imidized portion of the aromatic imide polymer precursor is imidized. Accordingly, it is difficult to stably carry out the drawing procedure. Also, it is difficult or practically impossible to stably produce a shaped and drawn aromatic imide polymer article having a very high tensile strength and modulus of elasticity.

SUMMARY OF THE INVENTION

An object of the invention is to provide a process for producing a shaped and drawn aromatic imide polymer article having an excellent tensile strength and modulus of elasticity while maintaining the heat resistance thereof at a high level similar to that inherent in conventional aromatic imide polymers.

The above-mentioned object can be attained by the process of the present invention which comprises the steps of: shaping a solution of an aromatic polyamic acid and an imidizing agent in an organic polar solvent while simultaneously imidizing the aromatic polyamic acid to provide a self-supporting precursor article containing 20 to 87% by weight of a volatile substance and having a tensile strength of 1.5 kg/mm² or more and an ultimate elongation of 30% or more; drawing the precursor article at a draw ratio of 1.3 or more; and heat-treating the drawn article at a temperature of 150° C. or more.

DESCRIPTION OF THE PREFERRED EMBODIMENTS

In the process of the present invention, the tensile strength and the ultimate elongation of the self-supporting precursor article are determined in accordance with ASTM D-882.

The solution of the aromatic polyamic acid and the imidizing agent in the organic solvent is prepared by polymerizing an aromatic tetracarboxylic acid component with an aromatic diamine component in the organic solvent in accordance with a conventional method and by mixing the imidizing agent with the resultant aromatic polyamic acid solution.

The aromatic diamine component usable for the present invention preferably comprises at least one member selected from benzene diamine compound, for example, 1,4-diaminobenzene, 1,3-diaminobenzene, and 1,2-diaminobenzene; diphenylether diamine compounds and diphenylthioether diamine compounds, for example, 4,4'-diaminodiphenylether, 3,4'-diaminodiphenylether, 3,3'-diaminodiphenylether andn 4,4'-diaminodiphenylthioether; benzophenone diamine compounds, for example, 3,3'-diaminobenzophenone and 4,4'-diaminobenzophenone; diphenylphosphine diamine compounds, for example, 3,3'-diaminodiphenylphosphine and 4,4'-diaminodiphenylphosphine; diphenylalkylenediamine compounds, for example, 3,3'-diaminodiphenylmethane, 4,4'-diaminodiphenylmethane, 3,3'-diaminodiphenylpropane and 4,4'-diaminodiphenylpropane; diphenylsulfide diamine compounds, for example, 3,3'-diaminodiphenylsulfide and 4,4'-diaminodiphenylsulfide; diphenylsulfone diamine compounds, for example, 3,3'-diaminodiphenylsulfone and 4,4'-diaminodiphenylsulfone; and benzidine compounds, for example, benzidine, and 3,3'-dimethylbenzidine.

More preferably, the aromatic diamine component comprises either or both of 1,4-diaminobenzene and 4,4'-diaminodiphenylether.

The aromatic tetracarboxylic acid component usable for the present invention preferably comprises at least one member selected from aromatic tetracarboxylic acids, for example, 3,3',4,4'-biphenyltetracarboxylic acid, 2,3',3,4'-biphenyltetracarboxylic acid, pyromellitic acid, 3,3',4,4'-benzophenonetetracarboxylic acid, 2,2-bis(3,4-dicarboxyphenyl) propane, bis(3,4-dicarboxyphenyl)methane, bis(3,4-dicarboxyphenyl)ether, bis(3,4-dicarboxyphenyl)thioether, bis(3,4-dicarboxyphenyl)phosphine and bis(3,4-dicarboxyphenyl)sulfone, and dianhydrides, salts and esters of the above-mentioned acids.

More preferably, the aromatic tetracarboxylic acid component comprises at least one aromatic tetracarboxylic dianhydride, still more preferably, either or both of 3,3',4,4'-biphenyltetracarboxylic dianhydride and pyromellitic dianhydride.

Usually, in the preparation of the aromatic polyamic acid, the aromatic diamine component and the aromatic tetracarboxylic acid component are polymerized with each other in substantially equimolar amounts. But, the amount of either one of the aromatic amine and tetracarboxylic acid components may be greater than the amount of the other, preferably at most 10 molar%, more preferably at most 5 molar%, more than the amount of the other.

Either or both of the aromatic diamine and tetracarboxylic acid components may consist of a single compound or two or more different compounds.

The organic polar solvent usable for the preparation of the aromatic polyamic acid must be able to evenly dissolve therein the aromatic diamine and tetracarboxylic acid components, and oligomers and low molecular weight prepolymers of the components, preferably in a concentration of 40% by weight or more of the above-mentioned compounds.

The organic polar solvent preferably comprises at least one member selected from polar amide compounds, for example, N,N-dimethylformamide, N,N-dimethylacetamide, N,N-diethylformamide, N,N-diethylacetamide, N-methyl-2-pyrrolidone and N-methylcaprolactam; and other polar liquid compounds, for example, dimethylsulfoxide, hexamethylphosphoramide, dimethylsulfone, tetramethylene sulfone, dimethyltetramethylene sulfone, pyridine and ethylene glycols.

The organic polar solvent may contain an additional solvent component consisting of at least one member selected from, for example, benzene, toluene, benzonitrile, xylene, solvent naphtha and dioxane.

In the preparation of the aromatic polyamic acid, the total concentration of the aromatic diamine and tetracarboxylic acid components in the organic polar solvent is preferably adjusted to a level of from 5 to 40% by weight, more preferably from 6 to 35% by weight, further preferably from 10 to 30% by weight.

The polymerization reaction of the aromatic tetracarboxylic acid component with the aromatic diamine component is carried out by dissolving the two components in the organic polar solvent and by heating the solution at a temperature of 100° C. or less, preferably 0° C. to 80° C., for 0.2 to 60 hours.

The solution of the aromatic diamine and tetracarboxylic acid components in the polar solvent preferably has a solution viscosity of about 0.1 to 50,000 poises, more preferably 0.5 to 30,000 poises, further preferably 1 to 20,000 poises, determined at a temperature of 30° C.: At this viscosity, the solution can be easily handled in the shaping procedure, and accordingly, the polymerization procedure is preferably carried out to an extent such that the resultant polymerization solution exhibits the above-mentioned level of rotation viscosity.

The aromatic polyamic acid solution prepared by the above-mentioned polymerization procedure is mixed with an imidizing agent and the resultant solution is subjected to a simultaneous shaping and cyclizationimidizing procedure to provide a self-supporting precursory article.

The simultaneous shaping and imidizing procedure is carried out under certain conditions adequate to provide a self-supporting precursor article containing 20 to 87% by weight of a volatile substance and having a tensile strength of at least 1.5 kg/mm$^2$ and an ultimate elongation of at least 30%.

The shaping and imidizing conditions are variable, depending on the types and concentrations of the aromatic polyamic acid, the imidizing agent, the organic solvent, and optionally the catalyst, and the polymerization retarder in the solution.

Generally, the simultaneous shaping and imidizing procedure is carried out at a temperature of from 30° C. to 150° C. for 1 to 60 minutes.

The aromatic polyamic acid is imidized in the presence of the imidizing agent. This imidization causes gelation (gelatinization) of the solution. The gelled solution of the aromatic imide polymer can form therefrom the above-mentioned self-supporting shaped precursor article. The partially imidized polymer in the shaped precursory article has an degree of imidization of 20% to 90%. Also, the shaped precursory article contains a volatile substance in an amount of 20 to 87% by weight.

The imidizing agent usable for the present invention preferably comprises at least one organic acid anhydride selected from aliphatic carboxylic anhydrides, aromatic carboxylic anhydrides, for example, acetic anhydride, propionic anhydride, butyric anhydride, maleic anhydride, phthalic anhydride, and benzoic anhydride. The preferable organic acid anhydride is an aliphatic carboxylic anhydride, particularly acetic anhydride.

The imidizing agent is used in an amount of 0.5 equivalent or more per equivalent of the amic acid unit in the aromatic polyamic acid. When the imidizing agent is used in an amount of less than 0.5 equivalent, the polyamic acid solution is sometimes not gelled in the shaping procedure.

The aromatic polyamic acid solution in the organic polar solvent may contain a catalyst comprising at least one organic base selected from, for example, tertiary amines, for example, aliphatic tertiary amines, aromatic tertiary amines and heterocyclic tertiary amines. The tertiary amines include, for example, trimethylamine, triethyl amine, dimethylamine, pyridine, β-picoline, isoquinoline and quinoline. THe isoquinoline is a preferable compound for the catalyst.

Also, the aromatic polyamic acid solution may contain a polymerization retarder consisting of, for example, acetylacetone, to retard the gelation of the aromatic polyamic acid solution until the solution is subjected to the shaping procedure.

The catalyst is preferably used in an amount of 0.1 equivalent or more per equivalent of the amic acid unit in the aromatic polyamic acid. When the amount of the ctalyst is less than 0.1 equivalent, it is difficult to effectively promote the imidization of the aromatic polyamic acid.

The aromatic polyamic acid solution is gelled and shaped into a shaped self-supporting precursor article by the simultaneous shaping and imidizing procedure. The shaped precursor article is preferably in the form of a film, sheet, filament or fiber. The shaping operation can be conducted by any conventional shaping method.

For example, when a precursory film is used, an aromatic polyamic acid solution containing an imidizing agent, and optionally, a catalyst and/or a polymerization retarder, is spread through a slit die onto a horizontal surface of a support, for example, a metallic, ceramic or plastic resin plate, roll or belt, to form a coating layer thereof having a uniform thickness of about 10 to 2,000 μm, preferably 20 to 1,000 μm. The coating layer of the aromatic polyamic acid solution is gradually heated at a temperature of 200° C. or less, preferably, 30° C. to 200° C., more preferably 50° C. to 150° C., so that the aromatic polyamic acid in the coating layer is partially cyclization-imidized and the solution coating layer is converted to a self-supporting film. In this heating procedure, if the heating rate is excessively high and/or the heating temperature is more than 200° C., foaming of the solution coating layer sometimes occurs, and thus a precursor film having a smooth surface cannot be produced.

The heating operation is carried out to an extent such that the resultant self-supporting precursory article exhibits a tensile strength of 1.5 kg/mm$^2$ or more, preferably 1.7 kg/mm$^2$ or more, and an ultimate elongation of 30% or more, preferably 50% or more.

When the resultant precursor article has a tensile strength of less than 1.5 kg/mm$^2$ and/or an ultimate elongation of less than 30%, it is difficult to draw the precursor article in a stable condition, and sometimes the drawing operation at a draw ratio of 1.3 or more cannot be applied to the precursor article, and therefore, the desired article having excellent physical properties cannot be obtained.

The shaped precursor article contains a volatile substance in an amount of 20% to 87%, preferably 25% to 85%. The volatile substance includes the organic polar solvent, water which is a by-product of the imidization reaction and the imidizing agent, and optionally, the catalyst and polymerization retarder.

The content of the volatile substance in the shaped precursor article is determined in the following manner.

The shaped precursor article is dried at a temperature of 420° C. for 20 minutes. The content of the volatile substance is calculated in accordance with the following equation.

$$A (\%) = \frac{W_1 - W_2}{W_1} \times 100$$

wherein A represents a content in weight % of the volatile substance in the shaped precursor article; $W_1$ represnts a weight of the non-dried precursor article; and, $W_2$ represents a weight of the dried precursory article.

The shaped precursor article is drawn in at least one direction at a draw ratio of 1.3 or more, preferably 1.3 to 3.5, more preferably 1. to 3.0. The drawing procedure may be carried out in two directions normal to each other. Also, the drawing procedure may be preferably effected at a temperature of from room temperature to 150° C., more preferably at room temperature. When the draw ratio is less than 1.3, the resultant article exhibits unsatisfactory physical properties, for example, mechanical strength and modulus of elasticity. The draw ratio must be less than a level at which the precursory article is broken.

The drawing procedure can be carried out by any conventional method and apparatus, for example, by a tenter or a drawing roller machine.

In the last step of the process of the present invention, the drawn article is heat-treated at a temperature of 150° C. or more, preferably 150° C. to 550° C., more preferably 180° C. to 500° C., to completely remove the residual volatile substance from the drawn article, to completely imidize the residual aromatic polyamic acid and thereby produce a shaped article having the desired physical properties.

The heat treatment can be carried out by any conventional method and apparatus, for example, a hot air heating oven or a ultraviolet ray heating furnace.

In the heating treatment, preferably the heat shrinkage of the drawn article is prevented by fixing both ends of the drawn article in the drawing direction. This is also preferable to prevent undesirable degradation of the physical properties of the drawn article, but the drawn article may be allowed to shrink to a certain extent in the heat treatment.

EXAMPLE

The present invention will be further explained by way of specific examples, which are representative and do not restrict the scope of the present invention in any way.

EXAMPLES 1 to 5

In each of Examples 1 to 5, a solution of equimolar amounts of 3,3′,4,4′-biphenyltetracarboxylic dianhydride and 1,4-diaminobenzene in a solvent consisting of N,N-dimethylacetamide was subjected to a polymerization procedure at a temperature of 25° C. for one hour. The resultant polymerization solution contained 10% by weight of an aromatic polyamic acid and had a rotation viscosity of 500 poises at a temperature of 25° C.

The aromatic polyamic acid solution was mixed with an imidizing agent consisting of 2.0 equivalent of acetic anhydride and a catalyst consisting of 0.5 equivalent of isoquinoline, per equivalent of the amic acid unit in the aromatic polyamic acid. The mixed solution was uniformly spread on a horizontal surface of a glass plate, and the resultant solution layer was heated at the temperature and for the times as indicated in Table 1.

The resultant self-supporting precursor film had the volatile substance content, tensile strength, and ultimate elongation as indicated in Table 1.

The self-supporting precursor film also had a degree of imidization of the polyamic acid of 40% and a thickness of 50 to 80 μm.

The precursor film was drawn in the longitudinal direction thereof at a temperature of 25° C. and at the draw ratio indicated in Table 1.

The drawn film was heat-treated at a temperature of 200° C. for 10 minutes and then at 400° C. for 5 minutes, to produce an aromatic imide polymer film.

The film exhibited the properties shown in Table 1.

EXAMPLE 6

The same procedures as described in Example 1 were carried out except that the aromatic tetracarboxylic acid component consisted of pyromellitic dianhydride and the aromatic diamine component consisted of 4,4′-diaminodiphenylether.

The resultant aromatic imide polymer film exhibited the properties indicated in Table 1.

COMPARATIVE EXAMPLE 1

The same procedures as described in Example 1 were carried out except that the simultaneous shaping and imidizing procedure was carried out at a temperature of 125° C. for 30 minutes, and the resultant self-supporting precursor film had the ultimate elongation indicated in Table, which was less than 30%. Accordingly, the precursory film was not capable of being drawn at a draw ratio of 1.3 or more without breakage and was drawn at a draw ratio of 1.2.

The resultant drawn, heat-treated film had the unsatisfactory tensile strength and modulus of elasticity shown in Table 1.

COMPARATIVE EXAMPLE 2

The same procedures as described in Example 4 were carried out except that no imidizing agent was used. The resultant precursor film could not be stably drawn without breakage, and a drawn film was not obtained.

COMPARATIVE EXAMPLE 3

The same procedures as described in Example 2 were carried out except that no drawing operation was applied to the self-supporting precursor film. The properties of the non-drawn but heat-treated film are shown in Table 1. As can be seen in the Table, the tensile strength and modulus of elasticity of the film were unsatisfactory.

COMPARATIVE EXAMPLE 4

The same procedures as described in Example 6 were carried out except that no drawing operation was applied to the self-supporting precursor film. The resultant heat treated film had the poor tensile strength and modulus of elasticity shown in Table 1.

TABLE 1

| Example No. | | Shaping and imidizing procedure | | Self-supporting precursor film | | | Drawing procedure | Drawn, heat-treated film | | |
|---|---|---|---|---|---|---|---|---|---|---|
| | | Temperature (°C.) | Time (min) | Content of volatile substance (wt. %) | Tensile strength (kg/mm$^2$) | Ultimate elongation (%) | Draw ratio | Tensile strength (kg/mm$^2$) | Ultimate elongation (%) | Modulus of elasticity (kg/mm$^2$) |
| Example | 1 | 90 | 20 | 36 | 6.7 | 118 | 2.0 | 59 | 3.8 | 2180 |
| | 2 | 90 | 10 | 70 | 2.4 | 150 | 2.3 | 50 | 2.3 | 2534 |
| | 3 | 90 | 5 | 82 | 2.2 | 216 | 2.5 | 110 | 1.5 | 3567 |
| | 4 | 125 | 5 | 42 | 5.8 | 135 | 2.0 | 79 | 2.5 | 2457 |
| | 5 | 125 | 10 | 35 | 10.5 | 63 | 1.5 | 51 | 3.6 | 1982 |
| | 6 | 90 | 10 | 69 | 1.5 | 127 | 2.0 | 43 | 5.5 | 2308 |
| Comparative Example | 1 | 125 | 30 | 21 | 12.9 | 25 | 1.2 | 36 | 7.8 | 980 |
| | 2 | 125 | 5 | 42 | 0.9 | 54 | — | — | — | — |
| | 3 | 90 | 10 | 70 | 2.4 | 150 | — | 33 | 8.0 | 800 |
| | 4 | 90 | 10 | 70 | 1.5 | 127 | — | 28 | 13.5 | 450 |

The process of the present invention can easily produce a shaped aromatic imide polymer article having excellent mechanical properties, for example, a high tensile strength and high modulus of elasticity, in addition to the inherent excellent properties of the aromatic imide polymer, for example, high heat resistance, chemical resistance, and radiation resistance.

Also, the process of the present invention can be utilized to produce aromatic imide polymer thin films or fine filaments having enhanced mechanical properties in addition to an excellent heat resistance.

We claim:

1. A process for producing a shaped and drawn aromatic imide polymer article having enhanced physical propeties, comprising the steps of:
   shaping a solution of an aromatic polyamic acid and an imidizing agent in an organic polar solvent while simultaneously imidizing the aromatic polyamic acid under certain conditions adequate to provide a self-supporting precursor article containing 20 to 87% by weight of a volatile substance and having a tensile strength of at least 1.5 kg/mm$^2$ and an ultimate elongation of at least 30%;
   drawing the precursor article at a draw ratio of at least 1.3; and
   heat-treating the drawn article at a temperature of at least 150° C.

2. The process as claimed in claim 1, wherein the aromatic polyamic acid is a polymerization product of an aromatic diamine component with an aromatic tetracarboxylic acid component in an organic polar solvent.

3. The process as claimed in claim 1, wherein the imidizing agent comprises an organic carboxylic anhydride.

4. The process as claimed in claim 3, wherein the organic carboxylic anhydride is selected from aliphatic carboxylic anhydrides.

5. The process as claimed in claim 4, wherein the aliphatic carboxylic anhydride is acetic anhydride.

6. The process as claimed in claim 1, wherein the imidizing agent is contained in an amount of at least 0.5 equivalent per an amic acid unit of the aromatic polyamic acid in the solution.

7. The process as claimed in claim 1, wherein the drawing step of the precursor article is carried out at a temperature of from room temperature to 150° C.

8. The process as claimed in claim 1, wherein the draw ratio in the drawing step is in the range of from 1.3 to 3.5.

9. The process as claimed in claim 1, wherein the heat treatment is carried out of a temperature of from 180° C. to 500° C.

10. The process as claimed in claim 1, wherein the shaped article is in the form of a film or filament.

* * * * *